(12) United States Patent
Perlo et al.

(10) Patent No.: US 7,098,775 B2
(45) Date of Patent: Aug. 29, 2006

(54) SYSTEM TO AVOID THE COLLISION OF A VEHICLE WITH ANIMALS

(75) Inventors: Piero Perlo, Sommariva Bosco (IT); Valentina Grasso, Carignano (IT); Federica Valerio, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 57 days.

(21) Appl. No.: 10/502,571

(22) PCT Filed: Sep. 29, 2003

(86) PCT No.: PCT/IB03/04332

§ 371 (c)(1),
(2), (4) Date: Jul. 28, 2004

(87) PCT Pub. No.: WO2004/034782

PCT Pub. Date: Apr. 29, 2004

(65) Prior Publication Data

US 2005/0116828 A1    Jun. 2, 2005

(30) Foreign Application Priority Data

Oct. 15, 2002   (IT)   .................... TO2002 A 000894

(51) Int. Cl.
*G08B 3/10*   (2006.01)
(52) U.S. Cl. ............................. 340/384.2; 340/384.1; 340/904; 340/937; 340/436

(58) Field of Classification Search ................ 340/903, 340/904, 937, 436, 384.1, 384.2; 701/213, 701/301; 702/142, 143; 348/113, 115
See application file for complete search history.

(56) References Cited

U.S. PATENT DOCUMENTS

| | | | |
|---|---|---|---|
| 5,278,537 A | 1/1994 | Carlo et al. | |
| 5,602,523 A | 2/1997 | Turchioe et al. | |
| 5,793,308 A * | 8/1998 | Rosinski et al. | ............. 340/903 |
| 5,969,593 A * | 10/1999 | Will | ........................ 340/384.2 |
| 6,016,100 A | 1/2000 | Boyd et al. | |
| 6,115,058 A * | 9/2000 | Omori et al. | .................. 348/45 |
| 6,134,184 A | 10/2000 | Waletzky et al. | |
| 6,405,132 B1 * | 6/2002 | Breed et al. | ................ 701/301 |
| 6,885,968 B1 * | 4/2005 | Breed et al. | ................ 702/143 |

FOREIGN PATENT DOCUMENTS

EP    1 245 443 A    10/2002

* cited by examiner

*Primary Examiner*—Van T. Trieu
(74) *Attorney, Agent, or Firm*—Sughrue Mion, PLLC

(57) ABSTRACT

A system and a method avoids the collision of a vehicle with animals tending to cross the road before the moving vehicle. Such system comprises a visual system directly actuating a RF emitter, or more RF emitters, emitting directional sound waves with a frequency above 25,000 Hz. Sound waves are directed frontally though with a frequency decreasing from the center of the roadway towards the road edge, so as to lead the animal to move towards the road edge.

7 Claims, 4 Drawing Sheets

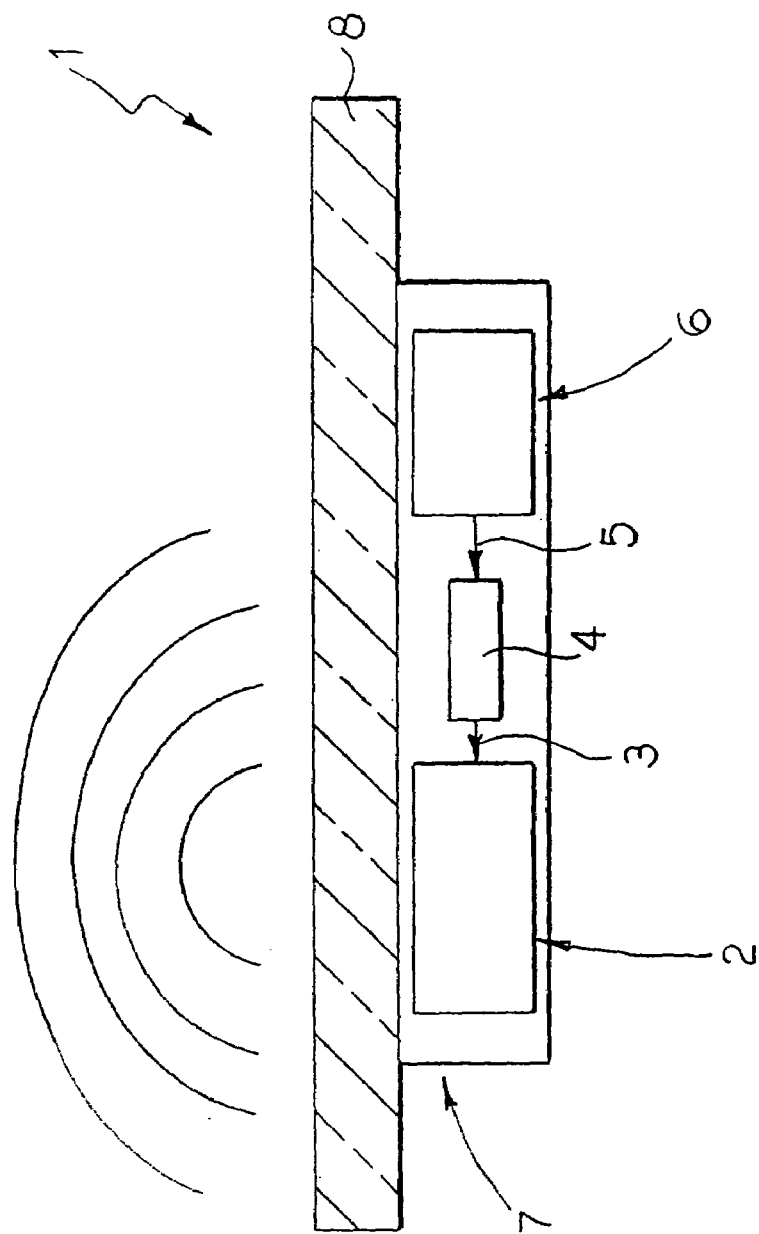

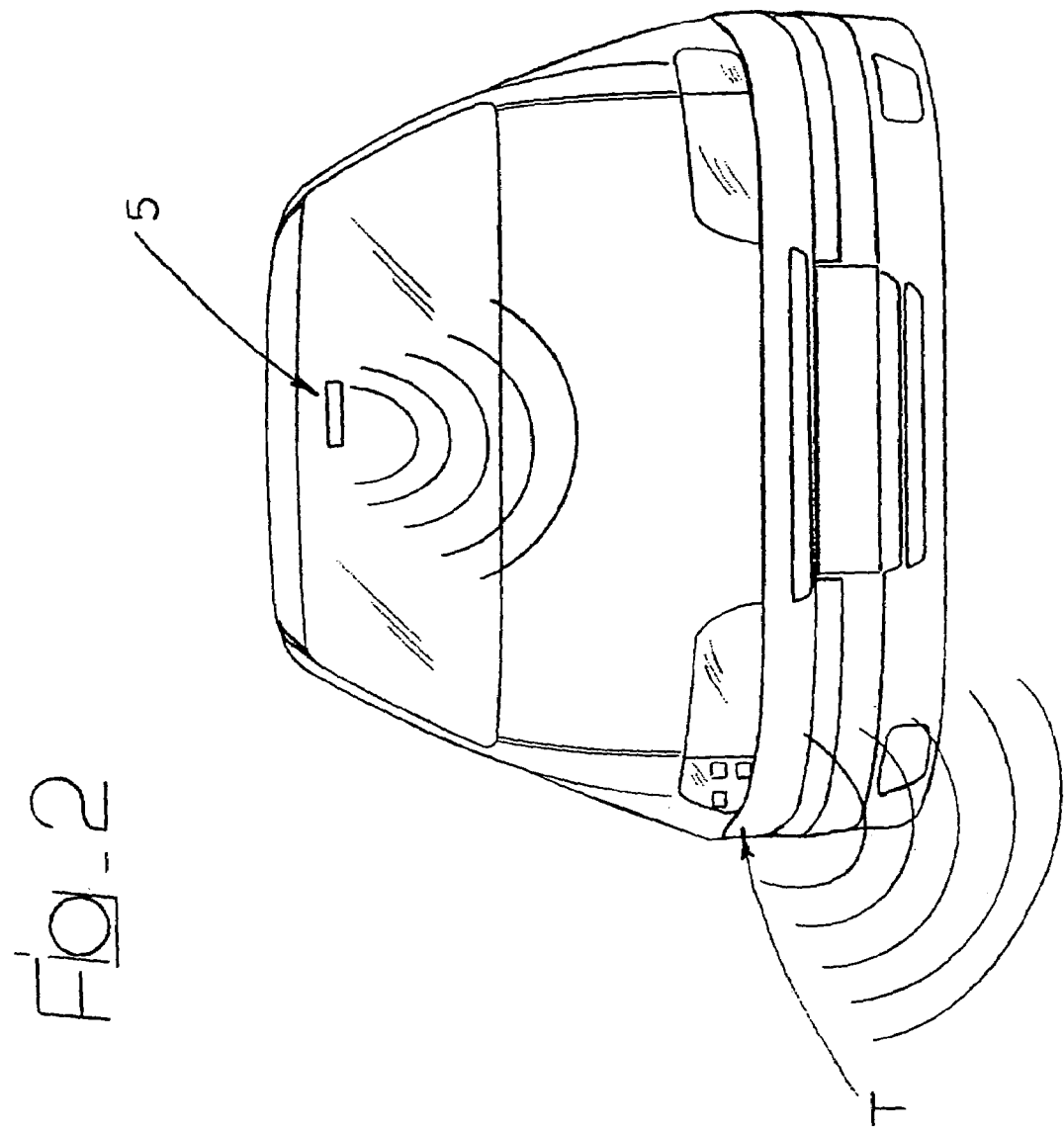

Figure 5:
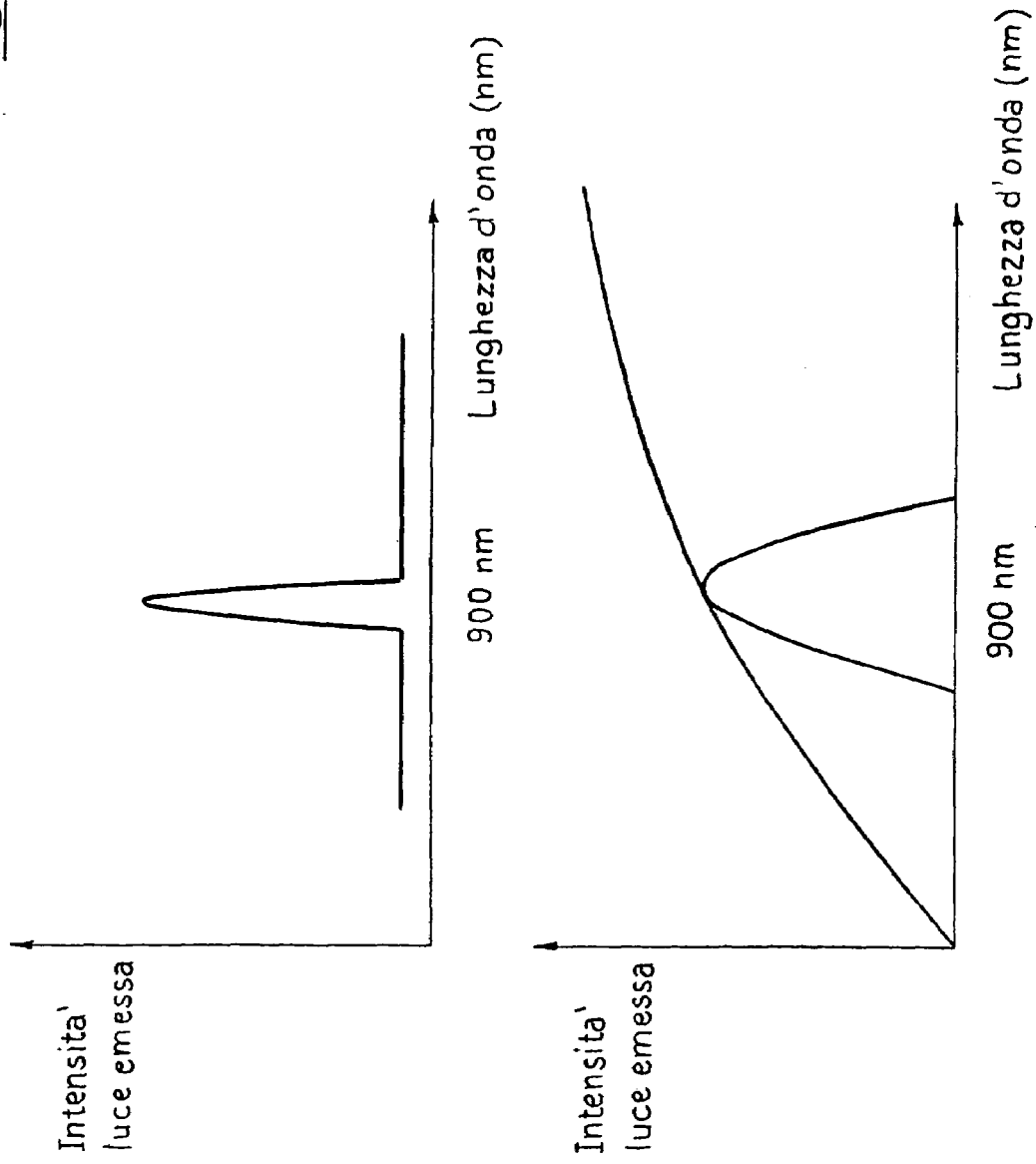

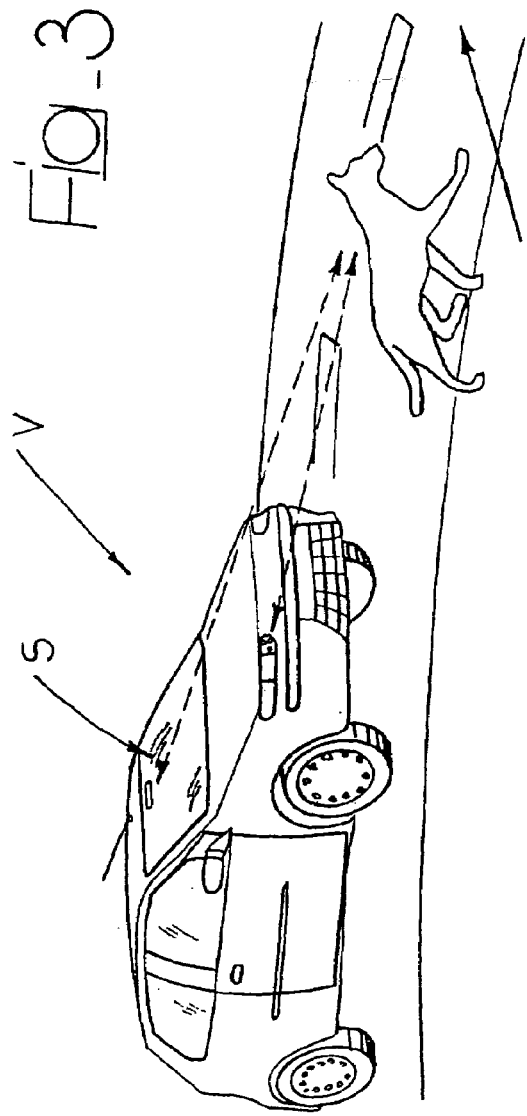
Fig_3
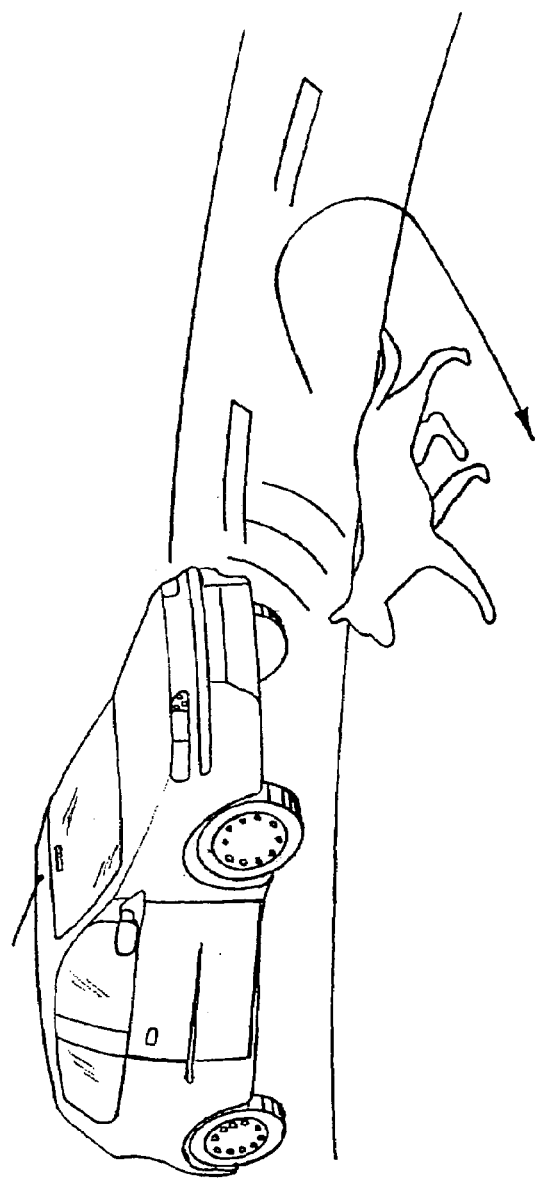
Fig_4

SYSTEM TO AVOID THE COLLISION OF A VEHICLE WITH ANIMALS

CROSS-REFERENCE TO RELATED APPLICATIONS

This application is benefit of a 371 of PCT/IB03/04332, filed on 29 Sep. 2003.

The present invention refers to on-board devices for motor cars to avoid the collision with animals suddenly crossing the road before the vehicle.

BACKGROUND OF THE INVENTION

Statistical data show that from 1984 to 1993 40,000 roads accidents took place only in Italy, in which 4,000 people were injured and 200 people died, due to animals crossing roads, especially abandoned dogs. Only in the area comprising the province of Turin, Italy, in the second half of 2001 there were 157 accidents due to wild animals crossing roads, in particular wild boars, but also roes, foxes, stags and badgers.

In general in Europe the number of accidents involving animals and vehicles, considering only large mammals, has been calculated to be of 507,000, with 100 deaths, 30,000 injured people and damages for about 1,000,000 Euro. The corresponding figure for each Italian province is of about 100 accidents every year.

Similarly alarming statistics come from the United States, especially as far as accidents involving stags are concerned. Every year there are 726,000 accidents with said animals in the United States, with subsequent damages for about 1,000,000 dollars. Always every year 29,000 people are injured and 200 people die in the United States due to this kind of accidents.

In the light of solving this problem several solutions have already been suggested, all of which propose the use of ultrasounds so as to keep the animal away from the area in which vehicles travel. Such a solution includes the so-called "wild life warning system" marketed by International Road Dynamics Inc., which achieves its objective by installing systems detecting the passage of vehicles and ultrasound emitters in stationary positions, typically in the areas where statistically animal crossing is most frequent. The sensors detect the arrival of a vehicle and thus activate ultrasound emitters, and—if necessary—light bands and/or scent emitters which frighten the animals and prevent the latter from crossing the road. The first system to be activated leads to the activation of the following ones on both road sides.

Ultrasound emission is an excellent system to make the animal get away, without simultaneously disturbing humans. Animals generally have a sound sensitive threshold that is far higher that humans. They can hear sounds having a lower intensity with respect to human ear. For instance, while the audible range for humans is of 64 to 23,000 Hz, the corresponding range for dogs is of 67–45,000 Hz, for cats of 45–64,000 Hz, for cows of 23–35,000, for sheep of 100–30,000 Hz, for rabbits of 360–42,000 Hz. Scientific researches have shown that generating sounds within the critical perceptible range a lot of animals feel so much disturbed and threatened to get away from sound source. At the same time humans are not disturbed by ultrasounds, which belong to a frequency range beyond human audible threshold. In humans the eardrum has a far lower specific resonance frequency than animals, and cannot therefore vibrate at ultrasound frequency. Human ear can perceive sounds up to a frequency of 20,000 Hz.

Considering the above, on-board devices to be installed on a vehicle have also been used to keep away animals crossing the road before said vehicle. For instance U.S. Pat. No. 5,278,537 discloses an electronic alarm system that generates ultrasounds to prevent animals from moving before the vehicle. Said device includes a simplified pilot circuit generating electric pulses in form of square waves having constant peak-to-peak tensions. The pilot circuit generates said square waves with sequentially increasing periodical wave frequencies followed by sequentially decreasing wave frequencies. A coupling transformer converts square waves into sinusoidal wave electric tensions having high peak-to-peak tensions, so that a piezoelectric transducer emits ultrasounds with periodically increasing frequencies followed by periodically decreasing frequencies, thus simulating the effect of a siren, without overheating the transducer and causing its premature breaking. The ultrasonic effect thus obtained confounds the animal and prevents the latter from suddenly crossing the road before the vehicle.

SUMMARY OF THE INVENTION

Though useful, such device however implies an active intervention by the driver in order to actuate the alarm system.

Stationary systems emitting ultrasounds for keeping animals away are also known for instance from Swiss Patent CH-A-52 357 and from U.S. Pat. No. 4,001,817.

The present invention aims at suggesting a new device and a new method to avoid the collision of a vehicle with an animal, which does not imply the installation of stationary systems near the road, but which can be simply installed on board the vehicle and which is at the same time more efficient than known devices in canceling or reducing the risk of accidents due to animal crossing, the whole without diverting the driver's attention from car driving.

In the light of achieving said aim, the object of the invention is an on-board system to be installed on a vehicle, avoiding collisions of said vehicle with animals tending to suddenly crossing the road before the vehicle, characterized in that said system comprises a visual system detecting the presence of one or more animals near the vehicle, an electronic control system receiving an output signal from said visual system and subsequently activating a signal for actuating the alarm system, and eventually means emitting directional high-frequency sound waves, i.e. with a frequency above 25,000 Hz, which is activated by said actuating signal so as to lead away the animal or animals whose presence has been detected.

The aforesaid visual system is preferably equipped both with means for day operation and with means for operation in low visibility conditions, for instance at night. The first kind of means can consist of a camera equipped with a sensor based on CCD or CMOS technology. The second type of visual means preferably consists of a CMOS camera with infrared sensor associated with a lighting system based on a matrix with emitting LEDs, with a wavelength for instance of 900 nm, and/or projectors with visible filters. As an alternative, heat cameras or a system consisting of matrixes of resistive bolometers, or a matrix of thermoelectric sensors can be used.

According to a further preferred aspect of the invention, the aforesaid electronic control means are also programmed so as to detect the animal's presence on the basis of its figure as detected by the visual system. The electronic central unit can carry out a screening of the various shapes and figures it meets. After detecting an animal, it can be provided that the emitting means emit a signal having a different frequency, suited to the specific type of animal to keep away.

In one of the possible variants the device should direct sound waves in frontal direction, though with a frequency degree decreasing from the center of the roadway towards the road edge, so as to lead the animal to move away. The electronic control system can also be connected to a display on the car instrument panel, so as to emit an optical/sound signal warning the driver of the dangerous situation occurring.

Further characteristics and advantages will be evident from the following description with reference to the accompanying drawings, provided as a mere non-limiting example, in which:

BRIEF DESCRIPTION OF THE INVENTION

FIG. 1 is a diagram showing the structure of the system according to the invention, FIG. 2 shows a vehicle equipped with a system according to the invention, FIGS. 3, 4 show a vehicle equipped with the system according to the invention, before and after the intervention of the alarm system, FIGS. 5, 6 are diagrams referring to two different solution of lighting system to be used in association with the IR sensor.

DETAILED DESCRIPTION OF THE INVENTION

In FIG. 1 reference number 1 globally refers to a device according to the invention comprising an emitter 2 of high-frequency directional waves (RF), in particular having a frequency at least above 25,000 Hz, based on MEMS technology. The activation of the emitter 2 is determined by a signal 3 emitted by an electronic control system 4 after receiving an output signal 5 from a visual system 6, which—as already mentioned—can consist of a camera equipped with a CCD or CMOS sensor for day operation, and of a CMOS camera equipped with an IR sensor for operations in low visibility conditions, for instance at night. The IR sensor is associated with a lighting system based on a matrix of emitting LEDs (see diagram of FIG. 5 showing the variation of intensity of light emitted by said matrix as a function of wavelength, a peak being provided at about 900 nm), or alternatively with a projector equipped with visible light (see diagram at the bottom of FIG. 5). The assembly consisting of the visual system 6, the electronic central unit 4 and the emitter 2 is arranged within a housing 7 associated with a glass plate 8. The device thus carried out can be positioned on the vehicle windscreen at the same height as the inner rear-view mirror, i.e. in the position referred to with S in FIG. 2. As an alternative, the system can be positioned on the lights, in the position referred to with T.

In a possible variant the visual system, the RF emitter and the electronic control system are independent, separate devices. The visual system is placed on the windscreen at the same height as the rear-view mirror, in S position, whereas the emitter is arranged in T position so as to prevent any possible disturb to the user and above all to prevent trouble deriving from animals within the car.

During operation the visual system positioned in S position on the vehicle V (FIG. 3) acquires images when the vehicle is moving. The electronic control central unit is programmed so as to carry out an image screening. When one of these images is aligned with one of those contained in a database of images stored in the control unit system, an alarm actuating signal is emitted. The system can provide a different operation in case visibility is excellent, for instance during the day, or low, for instance at night, so as to achieve at every moment the best detection efficiency. Once the animal's body has been detected, the RF emitter is activated. It thus sends high-frequency low-intensity sound waves directed towards said body, starting from the center of the roadway and decreasing towards the side portion of the roadway, so as to lead the animal to move in a preferential direction (FIG. 4).

Obviously, though the basic idea of the invention remains the same, construction details and embodiments can widely vary with respect to what has been described and shown, however without leaving the framework of the present invention.

What is claimed is:

1. On-board system to be installed on a vehicle, avoiding collisions of said vehicles with animals tending to suddenly cross the road before the vehicle, wherein said system comprises a visual system detecting the presence of one or more animals near the vehicle, an electronic control system receiving an output signal from said visual system and subsequently activating an actuating signal, and eventually means emitting directional high-frequency sound waves emitting with a frequency above 25,000 Hz, which is activated by said actuating signal so as to lead away the animal or animals whose presence has been detected, and wherein the emitting means directs sound waves in a frontal direction, though with a frequency degree decreasing from the center of the roadway towards the road edge, so as to lead the animal away.

2. System according to claim 1, wherein said visual system is equipped both with means for day operation and with means for operation in low visibility conditions, for instance at night.

3. System according to claim 2, wherein said means for day operation consist of a camera equipped with a sensor based on CCD or CMOS technology.

4. System according to claim 2, wherein said means for operation in low visibility conditions consist of a CMOS camera equipped with an infrared sensor associated with a system chosen among: a lighting device based on a matrix of emitting LEDs, a system consisting of projectors with visible filter, a system consisting of heat cameras, a system consisting of matrixes of resistive bolometers, a matrix of thermoelectric sensors.

5. System according to claim 4, wherein said lighting device is based on a matrix of emitting LEDs with a wavelength of about 900 nm.

6. System according to claim 1, wherein the aforesaid electronic control means are programmed so as to:

detect the animal's presence on the basis of its figure as detected by the visual system, carrying out a screening of the various shapes and figures it meets.

7. System according to claim 1, wherein the electronic control system is connected to a display on the vehicle instrument panel, so as to emit an optical/sound signal informing the driver about the dangerous situation occurring.

* * * * *